Patented Sept. 20, 1932

1,878,058

UNITED STATES PATENT OFFICE

WERNER ZERWECK, OF FRANKFORT-ON-THE-MAIN-FECHENHEIM, GERMANY, ASSIGNOR TO GENERAL ANILINE WORKS INC., OF NEW YORK, N. Y., A CORPORATION OF DELAWARE

PROCESS FOR MANUFACTURING VAT DYESTUFFS OF THE ANTHANTHRONE SERIES

No Drawing. Application filed May 3, 1929, Serial No. 360,321, and in Germany May 9, 1928.

I have found that valuable vat dyestuffs are obtained by acting with an acylating agent on an amino-anthraquinonyl-anthanthronyl-amine of the general formula:

anthanthrone (-NH-anthraquinone-$NH_2$)$_n$, wherein $n$ means the number 1 or 2. The dye stuffs thus produced correspond to the general formula:

anthanthrone (-NH-anthraquinone-NH-acyl)$_n$, wherein $n$ has the above signification. The amino-anthraquinonyl-anthanthronyl-amines used as starting material in my process may be obtained by condensing halogenated anthanthrones with diamino-anthraquinones. The condensation is carried out by heating said compounds in naphthalene and in the presence of copper acetate and sodium acetate. When halogenated anthanthrones are condensed with amino-acyl-amino-anthraquinones by heating said compounds in naphthalene and in the presence of copper acetate, and sodium acetate, dyestuffs of the same kind are produced as obtainable by my present process. But my process has the technical advantage that it runs very smoothly and starts from cheaper anthraquinone-compounds.

In order to further illustrate my invention the following examples are given the parts being by weight and all temperatures in centigrade degrees. But I wish it to be understood that I am not limited to the particular conditions nor specific products mentioned therein.

Example 1

1 part of the condensation product obtainable from equimolecular proportions of mono-bromo-anthanthrone and 1.5-diamino-anthraquinone (which product is a brownish black powder, yielding a bluish green solution in concentrated sulfuric acid and a bluish red hydrosulfite vat) is mixed with about 50 parts of nitro-benzene and 4.8 parts of benzoyl-chloride and the mixture is stirred at 180° for 2 hours, advantageously with the addition of 1 part of collidine. The cooled reaction mass is filtered and the residue is washed with nitrobenzene and spirit and dried. The new dyestuff thus obtained corresponds to the formula:

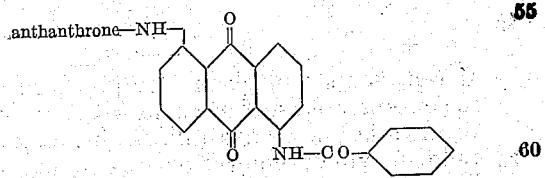

It represents when dry a dark powder soluble in concentrated sulfuric acid with a yellowish olive-green tint. It dyes cotton from a reddish violet vat fast bluish grey shades.

Example 2

1 part of 1-amino-4-anthanthronyl-amino-anthraquinone (being a bluish black powder, soluble in concentrated sulfuric acid with a greenish blue tint, yielding a reddish violet hydrosulfite vat) is treated with benzoylchloride as described in the foregoing example. The new dyestuff thus obtained corresponds to the formula:

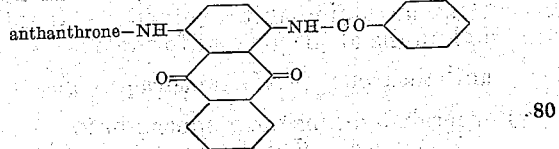

It dissolves in concentrated sulfuric acid to a grass green solution and dyes cotton from a reddish violet hydrosulfite vat greenish blue shades of a good fastness.

Example 3

The condensation product obtained from 1 molecular proportion of dibromo-anthanthrone and 12 molecular proportions of 1.5- diamino-anthraquinone (which condensation product is a dark powder, yielding a blackish brown solution in concentrated sulfuric acid and a turbid red hydrosulfite vat) is treated with benzoyl-chloride as described in Example 1. The dyestuff thus obtained corresponds to the formula:

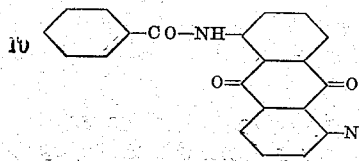

It is practically identical to the dyestuff described in Example 4 of U. S. application Serial No. 254,620, of 1928.

*Example 4*

When in Example 3 benzoyl-chloride is substituted by anisoyl-chloride and the process is carried out otherwise as there described, a new dyestuff is obtained which corresponds to the formula:

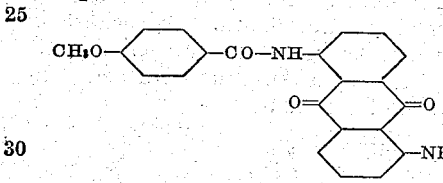

It represents a blackish blue powder soluble in concentrated sulfuric acid with a greenish, in an alkaline hydrosulfite solution with a reddish violet coloration. It dyes cotton bluish grey shades from a reddish violet vat.

A similar dyestuff is produced by replacing anisoyl-chloride by meta-methoxy-benzoyl-chloride.

I claim:—

1. A process which comprises heating with

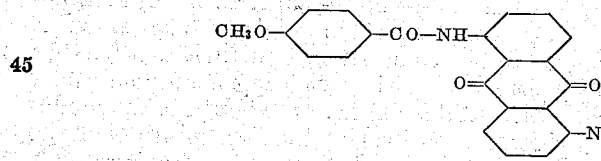

an acylating agent containing a benzene nucleus an amino-anthraquinonyl-anthanthronyl-amine of the general formula:

anthanthrone $(-NH-anthraquinone-NH_2)_n$ wherein $n$ means the number 1 or 2.

2. A process which comprises heating with benzoyl-chloride an amino-anthraquinonyl-anthanthronyl-amine of the general formula:

anthanthrone $(-NH-anthraquinone-NH_2)_n$, wherein $n$ means the number 1 or 2.

3. A process which comprises heating with benzoyl-chloride the condensation product, obtainable from commercial dibromo-anthanthrone and 2 molecular proportions of 1.5-diamino-anthraquinone, corresponding probably to the formula:

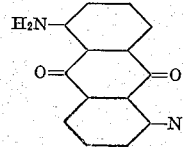 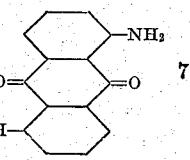

4. A process which comprises heating with anisoyl chloride an amino-anthraquinonyl-anthanthronyl-amine of the general formula:

anthanthrone $(-NH-anthraquinone-NH_2)_n$ wherein $n$ means the number 1 or 2.

5. A process which comprises heating with anisoyl chloride the condensation product, obtainable from commercial dibromo-anthanthrone and two molecular proportions of 1.5-

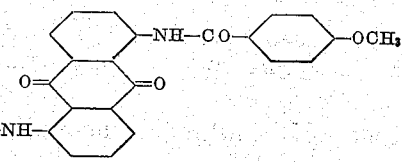

diamino-anthraquinone, corresponding probably to the formula:

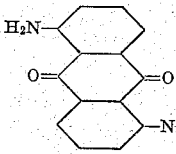 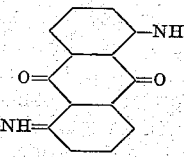

6. As a new compound the vat dyestuff of the probable formula:

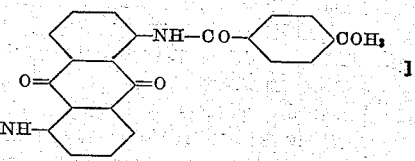

which compound represents a blackish-blue powder soluble in concentrated sulfuric acid with a greenish, in an alkaline hydrosulfite solution with a reddish-violet coloration. It dyes cotton bluish-grey shades from a reddish-violet vat.

In testimony whereof, I affix my signature.

WERNER ZERWECK.